US011980850B2

(12) United States Patent
Kobayashi et al.

(10) Patent No.: US 11,980,850 B2
(45) Date of Patent: May 14, 2024

(54) ULTRAFINE BUBBLE MANUFACTURING UNIT AND ULTRAFINE BUBBLE WATER MANUFACTURING DEVICE

(71) Applicant: MIIKE TEKKOU KABUSHIKIGAISHA, Fukuyama (JP)

(72) Inventors: Yoshikazu Kobayashi, Fukuyama (JP); Hidemasa Kobayashi, Fukuyama (JP); Masahide Hayashi, Fukuyama (JP); Koji Fujiwara, Fukuyama (JP); Etsuo Ishii, Fukuyama (JP)

(73) Assignee: MIIKE TEKKOU KABUSHIKIGAISHA, Fukuyama (JP)

( * ) Notice: Subject to any disclaimer, the term of this patent is extended or adjusted under 35 U.S.C. 154(b) by 459 days.

(21) Appl. No.: 17/418,018

(22) PCT Filed: Dec. 25, 2019

(86) PCT No.: PCT/JP2019/051036
§ 371 (c)(1),
(2) Date: Jun. 24, 2021

(87) PCT Pub. No.: WO2020/138248
PCT Pub. Date: Jul. 2, 2020

(65) Prior Publication Data

US 2022/0072486 A1 Mar. 10, 2022

(30) Foreign Application Priority Data

Dec. 25, 2018 (JP) ................................ 2018-241810

(51) Int. Cl.
*B01F 25/40* (2022.01)
*B01F 23/23* (2022.01)
(Continued)

(52) U.S. Cl.
CPC .......... *B01F 23/2375* (2022.01); *B01F 23/23* (2022.01); *B01F 23/232* (2022.01);
(Continued)

(58) Field of Classification Search
CPC ......... B01F 25/40; B01F 25/432; B01F 23/23
See application file for complete search history.

(56) References Cited

U.S. PATENT DOCUMENTS

2019/0240629 A1 8/2019 Nakamoto
2019/0374912 A1 12/2019 Nakao

FOREIGN PATENT DOCUMENTS

CN 108905663 A * 11/2018 .......... B01F 13/1027
JP 2002-11335 A 1/2002
(Continued)

OTHER PUBLICATIONS

International Search Report, issued in PCT/JP2019/051036, dated Mar. 17, 2020.

(Continued)

*Primary Examiner* — Robert A Hopkins
(74) *Attorney, Agent, or Firm* — Birch, Stewart, Kolasch & Birch, LLP

(57) ABSTRACT

An ultrafine bubble water manufacturing device includes a whirlpool pump, an ejector, a cascade pump, a branch portion on the downstream side of the cascade pump, a return path which communicates from the branch portion between the ejector and the cascade pump, a flow rate adjusting valve and a first ultrafine bubble manufacturing unit interposed in the return path, an emission path which communicates with the branch portion, a second ultrafine bubble manufacturing unit interposed in the emission path and a control device. The control device controls an air amount adjusting valve, the whirlpool pump, the cascade pump and the flow rate adjusting valve based on the mea-
(Continued)

surement values of a concentration meter for the emission path and first and second pressure gauges and on the downstream and upstream sides of the cascade pump.

11 Claims, 11 Drawing Sheets

(51) Int. Cl.

| | |
|---|---|
| ***B01F 23/232*** | (2022.01) |
| ***B01F 23/2326*** | (2022.01) |
| ***B01F 23/2375*** | (2022.01) |
| ***B01F 25/10*** | (2022.01) |
| ***B01F 25/23*** | (2022.01) |
| ***B01F 25/432*** | (2022.01) |
| *B01F 23/2373* | (2022.01) |

(52) U.S. Cl.
CPC ........ *B01F 23/2326* (2022.01); *B01F 25/102* (2022.01); *B01F 25/23* (2022.01); *B01F 25/432* (2022.01); *B01F 23/2373* (2022.01)

(56) References Cited

FOREIGN PATENT DOCUMENTS

| | | | | |
|---|---|---|---|---|
| JP | 2007-301460 | A | | 11/2007 |
| JP | 2008-272722 | A | | 11/2008 |
| JP | 2011-31129 | A | | 2/2011 |
| JP | 2011-115674 | A | | 6/2011 |
| JP | 2011115674 | A | * | 6/2011 |
| JP | 2012-239953 | A | | 12/2012 |
| JP | 2013-81944 | A | | 5/2013 |
| JP | 2014-200762 | A | | 10/2014 |
| JP | 2017-94300 | A | | 6/2017 |
| JP | 2018-65095 | A | | 4/2018 |
| WO | WO 2018/021217 | A | | 2/2018 |

OTHER PUBLICATIONS

Written Opinion of the International Searching Authority, issued in PCT/JP2019/051036, dated Mar. 17, 2020.

* cited by examiner

ULTRAFINE BUBBLE MANUFACTURING UNIT AND ULTRAFINE BUBBLE WATER MANUFACTURING DEVICE

TECHNICAL FIELD

The present invention relates to an ultrafine bubble manufacturing unit which forms gaseous ultrafine bubbles in a liquid and an ultrafine bubble water manufacturing device which uses the ultrafine bubble manufacturing unit.

BACKGROUND

Since ultrafine bubbles are air bubbles whose diameters are equal to or less than 1 μm, and are smaller than the wavelengths of visible light, the ultrafine bubbles cannot be visually recognized even when formed in a liquid. In comparison with microbubbles which are air bubbles whose diameters exceed 1 μm, the floating speed of the ultrafine bubbles is low, and thus the ultrafine bubbles can stay in a liquid for a long period of time. Furthermore, in comparison with the microbubbles, the ultrafine bubbles have large surface areas, and thus the ultrafine bubbles have a self-pressurizing effect and the electrification action of negative charge. By utilization of the characteristics as described above, the ultrafine bubbles are used in various fields such as agriculture, industry and fishing industry for various purposes.

As manufacturing devices for manufacturing the ultrafine bubbles as described above, manufacturing devices are conventionally proposed which manufacture the ultrafine bubbles by applying ultrasonic waves to microbubbles having diameters of about 10 to 50 μm and crushing the microbubbles to finely reduce the microbubbles (see, for example, patent literature 1).

In the ultrafine bubble manufacturing device disclosed in patent literature 1, microbubble-containing water is manufactured in a bubble generating portion, and the microbubble-containing water is temporarily stored in a storage portion. The microbubble-containing water stored in the storage portion is left to stand still, and thus bubbles having small diameters are collected in a lower part of the storage portion. The microbubble-containing water having small diameters is taken out from the lower part of the storage portion and is guided to a crushing portion, and ultrasonic waves are applied thereto in the crushing portion. The microbubbles to which the ultrasonic waves are applied are crushed to be finely reduced, and thus the ultrafine bubbles are manufactured. The ultrasonic waves are applied from an ultrasonic wave generating portion provided on one side surface of a passage forming the crushing portion to the microbubble-containing water flowing through the passage.

Patent Literature 1: JP 2014-200762 A

SUMMARY

Problems to be Solved by the Invention

However, since the ultrafine bubble manufacturing device disclosed in patent literature 1 requires the ultrasonic wave generating portion and a power supply and a control device for the ultrasonic wave generating portion, the configuration of the device is complicated, with the result that the device is disadvantageously relatively increased in size and cost. Moreover, disadvantageously, since in the crushing portion, the bubbles are crushed with the ultrasonic waves applied from one side to the microbubble-containing water flowing through the passage, and thus the ultrafine bubbles are manufactured, the efficiency of the manufacturing of the ultrafine bubbles is relatively low, and the diameters of the ultrafine bubbles are unlikely to be uniform. A step of collecting the bubbles having small diameters in the lower part of the storage portion with the microbubble-containing water left to stand still in the storage portion and a step of taking out the microbubble-containing water from the lower part of the storage portion cannot be continuously performed, with the result that these steps are batch steps. Hence, the ultrafine bubbles are intermittently manufactured, and thus the efficiency of the manufacturing is disadvantageously low.

Hence, an object of the present invention is to provide an ultrafine bubble manufacturing unit and an ultrafine bubble water manufacturing device with relatively simple device configurations. An object of the present invention is also to provide an ultrafine bubble manufacturing unit and an ultrafine bubble water manufacturing device which have a relatively high efficiency of manufacturing of ultrafine bubbles and which can produce ultrafine bubbles having uniform diameters.

Solution to Problems

In order to solve the above-described problems, the present invention provides an ultrafine bubble manufacturing unit for manufacturing gaseous ultrafine bubbles contained in water, the ultrafine bubble manufacturing unit comprising:

a casing having a circular cross section;

a supply pipe connected to one end of the casing, extending coaxially with the casing and supplying a mixed fluid of water and a gas;

a fine-reducing block having at least part stored within the casing and including a plurality of swirling flow forming portions each forming a swirling flow of the mixed fluid supplied from the supply pipe into the casing, the fine-reducing block causing the swirling flows formed in the swirling flow forming portions to collide with each other and finely reducing the gas in the mixed fluid so as to generate ultrafine bubble water; and an emission pipe arranged on a side of the other end of the casing to emit the ultrafine bubble water generated in the fine-reducing block to an outside of the casing.

In the configuration described above, the ultrafine bubble manufacturing unit formed with the casing, the supply pipe, the emission pipe and the fine-reducing block stored within the casing can easily be reduced in size. The fine-reducing block of the ultrafine bubble manufacturing unit includes a plurality of swirling flow forming portions forming the swirling flows of the mixed fluid, and causes the swirling flows formed in the swirling flow forming portions to collide with each other and finely reduces the gas in the mixed fluid so as to generate the ultrafine bubble water. Hence, since the ultrafine bubble water can be produced without use of an ultrasonic wave generating portion or the like and produced with a small number of components, the ultrafine bubble manufacturing unit can be relatively reduced in size and can be produced inexpensively. In the fine-reducing block, a step of forming the swirling flows in the swirling flow forming portions and a step of causing the swirling flows to collide with each other to finely reduce the gas in the mixed fluid can be continuously performed. Hence, as compared with a conventional device which performs batch steps, it is possible to efficiently manufacture the ultrafine bubbles. By causing the swirling flows to collide with each other to finely reduce the gas in the mixed fluid, it is also possible to efficiently manufacture the ultrafine bubbles having more uniform diameters than conventional ultrafine bubbles.

In one embodiment of the ultrafine bubble manufacturing unit, the fine-reducing block includes a first swirling chamber serving as the swirling flow forming portion forming the swirling flow of the mixed fluid around a swirling axis coaxial with the casing, a second swirling chamber formed on a side distant from the supply pipe with respect to the first swirling chamber and forming the swirling flow of the mixed fluid around the swirling axis coaxial with the casing, the swirling flow swirling in a direction opposite to the swirling flow formed in the first swirling chamber, a collision chamber causing the swirling flow of the mixed fluid formed in the first swirling chamber and the swirling flow of the mixed fluid formed in the second swirling chamber to collide with each other and an emission passage guiding, to a side of the emission pipe, the ultrafine bubble water produced by the collision of the swirling flows of the mixed fluid in the collision chamber, and the emission pipe is coupled to the fine-reducing block to communicate with the emission passage so as to support the fine-reducing block within the casing.

In the embodiment described above, the fine-reducing block within the casing is formed to include: the first swirling chamber forming the swirling flow of the mixed fluid around the swirling axis coaxial with the casing; the second swirling chamber formed on the side distant from the supply pipe with respect to the first swirling chamber and forming the swirling flow of the mixed fluid around the swirling axis coaxial with the casing, the swirling flow swirling in the direction opposite to the swirling flow formed in the first swirling chamber; the collision chamber causing the swirling flow of the mixed fluid formed in the first swirling chamber and the swirling flow of the mixed fluid formed in the second swirling chamber to collide with each other; and the emission passage guiding, to the side of the emission pipe, the ultrafine bubble water produced by the collision of the swirling flows of the mixed fluid in the collision chamber, with the result that the ultrafine bubble manufacturing unit can be reduced in size. The emission pipe is coupled to the fine-reducing block to communicate with the emission passage so as to support the fine-reducing block within the casing, and thus it is possible to store the fine-reducing block within the casing with a simple structure.

In one embodiment of the ultrafine bubble manufacturing unit, the fine-reducing block includes a first block component including the first swirling chamber, a first introduction path introducing the mixed fluid within the casing into a side of one end of the first swirling chamber in a direction of a tangent to the first swirling chamber and a first discharge hole formed in the other end of the first swirling chamber and discharging the swirling flow and a second block component coupled to the first block component and including the second swirling chamber, a second introduction path introducing the mixed fluid within the casing into a side of one end of the second swirling chamber in a direction of a tangent to the second swirling chamber, a second discharge hole formed in the other end of the second swirling chamber opposite the first discharge hole of the first block component and discharging the swirling flow, a collision chamber surface coupled to the first block component and facing the collision chamber formed between the collision chamber surface and the first block component, an inflow port formed in the collision chamber surface and making the ultrafine bubble water in the collision chamber flow into the emission passage and an emission port formed in an end surface on a side opposite to a side having the first block component coupled and discharging the ultrafine bubble water flowing through the emission passage.

In the embodiment described above, the fine-reducing block is formed by coupling the first block component and the second block component together. The first block component includes the first swirling chamber, the first introduction path introducing the mixed fluid within the casing into the side of one end of the first swirling chamber in the direction of a tangent to the first swirling chamber and the first discharge hole formed in the other end of the first swirling chamber and discharging the swirling flow. The second block component includes the second swirling chamber, the second introduction path introducing the mixed fluid within the casing into the side of one end of the second swirling chamber in the direction of a tangent to the second swirling chamber and the second discharge hole formed in the other end of the second swirling chamber opposite the first discharge hole of the first block component and discharging the swirling flow. The second block component further includes the collision chamber surface coupled to the first block component and facing the collision chamber formed between the first block component and the second block component and the emission path extending between the inflow port formed in the collision chamber surface and the emission port formed in the end surface on the side opposite to the side having the first block component coupled. With the first block component and the second block component formed as described above, the small-sized fine-reducing block can be configured.

In one embodiment of the ultrafine bubble manufacturing unit, the first introduction path and the second introduction path are formed to be inclined with respect to a plane perpendicular to an axis of the fine-reducing block.

In the embodiment described above, the mixed fluid is introduced into the first swirling chamber through the first introduction path inclined with respect to the plane perpendicular to the axis of the fine-reducing block, and thus it is possible to effectively generate, within the first swirling chamber, the swirling flow swirling toward the first discharge hole. Moreover, the mixed fluid is introduced into the second swirling chamber through the second introduction path inclined with respect to the plane perpendicular to the axis of the fine-reducing block, and thus it is possible to effectively generate, within the second swirling chamber, the swirling flow swirling toward the second discharge hole. In this way, in the collision chamber located between the first discharge hole of the first swirling chamber and the second discharge hole of the second swirling chamber, the swirling flow from the first swirling chamber and the swirling flow from the second swirling chamber can be made to strongly collide with each other, with the result that it is possible to effectively finely reduce the bubbles in the gas included in each swirling flow and to thereby efficiently manufacture the ultrafine bubbles of the gas.

In one embodiment of the ultrafine bubble manufacturing unit, the fine-reducing block includes a treatment flow path formed in a direction coaxial with the casing to guide the mixed fluid, a first eccentric supply path introducing the mixed fluid into an upstream end of the treatment flow path in a direction eccentric to a center axis so as to form the swirling flow, the first eccentric supply path serving as the swirling flow forming portion and a second eccentric supply path introducing the mixed fluid into a downstream side with respect to the first eccentric supply path of the treatment flow path in a direction eccentric to the center axis and opposite to the first eccentric supply path so as to generate the swirling flow in a direction opposite to the swirling flow formed in the first eccentric supply path and to cause the swirling flows to collide with each other and the emission pipe is coupled to a downstream end of the treatment flow path in the fine-reducing block.

In the embodiment described above, the fine-reducing block includes the treatment flow path formed in the direction coaxial with the casing to guide the mixed fluid. The first eccentric supply path introducing the mixed fluid in a direction eccentric to the center axis to form the swirling flow and serving as the swirling flow forming portion communicates with the upstream end of the treatment flow path. The second eccentric supply path introducing the mixed fluid in a direction eccentric to the center axis and opposite to the first eccentric supply path and serving as the swirling flow forming portion communicates with the downstream side with respect to the first eccentric supply path of the treatment flow path. The second eccentric supply path is used to generate the swirling flow in a direction opposite to the swirling flow formed in the first eccentric supply path so as to cause the swirling flows to collide with each other, with the result that the bubbles in the gas included in the mixed fluid are effectively finely reduced and thus the ultrafine bubbles of the gas are generated. As described above, since the fine-reducing block includes the treatment flow path, the first eccentric supply path and the second eccentric supply path, it is possible to reduce the size of the ultrafine bubble manufacturing unit.

In another aspect of the present invention, there is provided an ultrafine bubble water manufacturing device formed with the aforementioned ultrafine bubble manufacturing unit, the ultrafine bubble water manufacturing device comprising:

a first pump pressure feeding raw material water;

a mixer mixing a gas into the raw material water pressure fed from the first pump to form the mixed fluid;

a second pump provided on a downstream side of the mixer;

a branch portion branching the mixed fluid into two paths on a downstream side of the second pump;

a return path connected to the branch portion and having a flow rate adjusting valve and a first ultrafine bubble manufacturing unit of the ultrafine bubble manufacturing units interposed therein, the return path returning water containing ultrafine bubbles of the gas manufactured in the first ultrafine bubble manufacturing unit between the mixer and the second pump; and an emission path connected to the branch portion and having a second ultrafine bubble manufacturing unit of the ultrafine bubble manufacturing units interposed therein, the emission path emitting water containing ultrafine bubbles of the gas manufactured in the second ultrafine bubble manufacturing unit.

In the configuration described above, the raw material water is pressure fed with the first pump, and the gas is mixed into the raw material water with the mixer. The mixed fluid pressure fed with the second pump on the downstream side of the mixer branches into the two paths at the branch portion. In the return path connected to the branch portion, when the flow rate adjusting valve is opened, part of the mixed fluid pressure fed from the second pump is guided into the first ultrafine bubble manufacturing unit, the gas in the mixed fluid is finely reduced and thus the ultrafine bubbles are formed. The water containing the ultrafine bubbles of the gas is returned between the mixer and the second pump, is combined with the mixed fluid from the mixer and is sucked by the second pump. On the other hand, in the emission path connected to the branch portion, part of the mixed fluid pressure fed from the second pump is guided into the second ultrafine bubble manufacturing unit, the gas in the mixed fluid is finely reduced and thus the ultrafine bubbles are formed. The water containing the ultrafine bubbles of the gas is emitted from the downstream side of the emission path so as to be used for a desired purpose. When the flow rate adjusting valve in the return path is closed, all the mixed fluid pressure fed from the second pump is guided into the second ultrafine bubble manufacturing unit, the ultrafine bubbles of the gas are formed and the water containing the ultrafine bubbles of the gas is emitted through the emission path. The degree of opening of the flow rate adjusting valve is adjusted, and thus it is possible to adjust the amount of water included in the ultrafine bubbles of the gas formed in the first ultrafine bubble manufacturing unit and returned to the second pump. Hence, the particle diameter and the concentration of the ultrafine bubbles of the gas in the water emitted from the emission path can be effectively adjusted.

In another aspect of the present invention, there is provided an ultrafine bubble water manufacturing device formed with the aforementioned ultrafine bubble manufacturing unit, the ultrafine bubble water manufacturing device comprising:

a first pump pressure feeding the mixed fluid obtained by mixing a gas into raw material water;

a mixer connected between a discharge side and a suction side of the first pump, mixing the gas into the mixed fluid discharged from the first pump and returning the mixed fluid to the suction side of the first pump;

the ultrafine bubble manufacturing unit provided on a downstream side of the first pump;

a second pump connected to a downstream side of the ultrafine bubble manufacturing unit;

a gas-liquid separator connected to a downstream side of the second pump; and an emission path emitting a liquid separated in the gas-liquid separator.

In the configuration described above, the mixed fluid obtained by mixing the gas into the raw material water is pressure fed with the first pump. Part of the mixed fluid discharged from the first pump is guided into the mixer connected between the discharge side and the suction side of the first pump, and the gas is mixed into the mixed fluid with the mixer. The mixed fluid into which the gas is mixed with the mixer is returned to the suction side of the first pump. The other parts of the mixed fluid discharged from the first pump are guided into the ultrafine bubble manufacturing unit provided on the downstream side, the gas in the mixed fluid is finely reduced and thus the ultrafine bubbles are formed. The water containing the ultrafine bubbles is sucked by the second pump connected to the downstream side of the ultrafine bubble manufacturing unit and is discharged toward the gas-liquid separator connected to the downstream side of the second pump. In the water containing the ultrafine bubbles guided into the gas-liquid separator, the gas guided together with this water is separated. The water containing the ultrafine bubbles which is a liquid left without being separated in the gas-liquid separator is emitted through the emission path. The ultrafine bubble manufacturing unit is interposed between the first pump and the second pump, the operation of the second pump is mainly adjusted and thus it is possible to stabilize the generated amount of water containing the ultrafine bubbles.

In one embodiment of the ultrafine bubble water manufacturing device, the second pump is a cascade pump.

In the embodiment described above, as the second pump, the cascade pump is used, and thus it is possible to stably generate the water containing the ultrafine bubbles of the gas.

In one embodiment of the ultrafine bubble water manufacturing device, the ultrafine bubble water manufacturing device further comprises:

a gas amount adjusting valve adjusting an amount of the gas mixed with the mixer into the raw material water or the mixed fluid.

In the embodiment described above, the gas amount adjusting valve is used to adjust the amount of the gas mixed with the mixer into the raw material water or the mixed fluid, and thus it is possible to adjust the concentration of the ultrafine bubbles in the ultrafine bubble water which is manufactured.

In one embodiment of the ultrafine bubble water manufacturing device, the ultrafine bubble water manufacturing device further comprises:

a concentration meter measuring a concentration of the ultrafine bubbles in the water emitted from the emission path; and a control device controlling the gas amount adjusting valve, the second pump and the flow rate adjusting valve based on a measurement value of the concentration meter.

In the embodiment described above, the concentration of the ultrafine bubbles in the water emitted from the emission path is measured with the concentration meter, and the gas amount adjusting valve, the second pump and the flow rate adjusting valve are controlled with the control device based on the measurement value of the concentration meter. In this way, the concentration of the ultrafine bubbles in the water emitted from the emission path can be stably adjusted to be a predetermined value.

In one embodiment of the ultrafine bubble water manufacturing device, the ultrafine bubble water manufacturing device further comprises:

an input portion having a diameter, a concentration and a flow rate of bubbles in bubble water needed to be emitted from the emission path input thereto;

a control device connected to the input portion and connected to the first pump, the second pump, the flow rate adjusting valve and the gas amount adjusting valve; and a table stored in the control device, the table storing possible values of a load of the first pump, a load of the second pump, a degree of opening of the flow rate adjusting valve and a degree of opening of the gas amount adjusting value and storing a diameter, a concentration and a flow rate of bubbles in bubble water emitted from the emission path corresponding to the possible values, wherein the control device extracts, based on values input to the input portion, with reference to the table, target values of the load of the first pump, the load of the second pump, the degree of opening of the flow rate adjusting valve and the degree of opening of the gas amount adjusting value, and controls the first pump, the second pump, the flow rate adjusting valve and the gas amount adjusting value so as to achieve the target values.

In the embodiment described above, the diameter, the concentration and the flow rate of the bubbles in the bubble water needed to be emitted from the emission path are input to the input portion. The control device is connected to the input portion to receive information from the input portion. The control device is also connected to the first pump, the second pump, the flow rate adjusting valve and the gas amount adjusting valve so as to control them. In the table stored in the control device, the possible values of the load of the first pump, the load of the second pump, the degree of opening of the flow rate adjusting valve and the degree of opening of the gas amount adjusting valve and the diameter, the concentration and the flow rate of the bubbles in the bubble water emitted from the emission path corresponding to the possible values are stored. When the diameter, the concentration and the flow rate of the bubbles in the bubble water are input to the input portion, the control device extracts, based on the values input to the input portion, with reference to the table, the target values of the load of the first pump, the load of the second pump, the degree of opening of the flow rate adjusting valve and the degree of opening of the gas amount adjusting valve. Then, the control device controls the first pump, the second pump, the flow rate adjusting valve and the gas amount adjusting valve so as to achieve the target values. Consequently, the bubble water that contains the bubbles having the diameter and the concentration input to the input portion and that has the flow rate which is input is manufactured.

DESCRIPTION OF EMBODIMENTS

Embodiments of the present invention will be described in detail below with reference to accompanying drawings.

Figure 1:
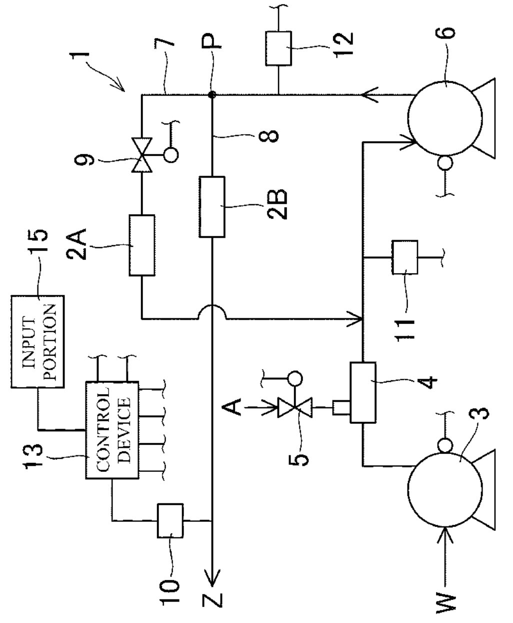
FIG. 1 is a schematic view showing an ultrafine bubble water manufacturing device according to a first embodiment of the present invention.

An ultrafine bubble water manufacturing device according to the embodiments of the present invention includes an ultrafine bubble manufacturing unit according to the embodiments of the present invention, and adds ultrafine bubbles of air serving as a gas into water to manufacture ultrafine bubble water. In the ultrafine bubble water manufacturing device 1 of a first embodiment, as shown in FIG. 1, raw material water such as tap water is supplied as indicated by an arrow W, then ultrafine bubbles of air are added into the suppled water and the water is emitted as indicted by an arrow Z. The ultrafine bubbles are air bubbles whose diameters are equal to or less than 1 μm. Air bubbles whose diameters are 1 to 100 μm are microbubbles. The ultrafine bubble water manufacturing device 1 and the ultrafine bubble manufacturing unit of the present embodiment can form only the ultrafine bubbles, both the ultrafine bubbles and the microbubbles or only the microbubbles.

The ultrafine bubble water manufacturing device 1 includes: a whirlpool pump 3 which pressure feeds the raw material water and which serves as a first pump; an ejector 4 which mixes the raw material water pressure fed from the whirlpool pump 3 with air and which serves as a mixer; and a cascade pump 6 which is provided on the downstream side of the ejector 4 and which serves as a second pump. The ultrafine bubble water manufacturing device 1 also includes: a branch portion P which branches the downstream side of the cascade pump 6 into two paths; a return path 7 which is connected to the branch portion P and in which the downstream side is joined between the ejector 4 and the cascade pump 6; and an emission path 8 which is connected to the branch portion P and which emits ultrafine bubble water. In the return path 7, a flow rate adjusting valve 9 and a first ultrafine bubble manufacturing unit 2A are interposed. In the emission path 8, a second ultrafine bubble manufacturing unit 2B is interposed. On the downstream side of the emission path 8, a concentration meter 10 is provided which measures the concentration of bubbles included in water emitted from the emission path 8. As the concentration meter 10, a concentration meter which can separately measure the concentration of the ultrafine bubbles and the concentration of the microbubbles is preferable. A first pressure gauge 11 is provided between the ejector 4 and the cascade pump 6 on an upstream side with respect to the joining position of the return path 7. A second pressure gauge 12 is provided on the side of discharge of the cascade pump 6. The ultrafine bubble water manufacturing device 1 includes a control device 13 which controls the operations of the individual portions.

The whirlpool pump 3 achieves the function of mixing air with the ejector 4 and cooperates with the cascade pump 6 to adjust the amount of ultrafine bubble water which is manufactured. As the whirlpool pump, an underwater pump or the like can be used. Although instead of the whirlpool pump, for example, another pump such as a plunger pump can be used as the first pump, a volumetric pump or a centrifugal pump is preferably used.

The ejector 4 sucks air as indicated by an arrow A into the raw material water discharged from the whirlpool pump 3 and mixes them together to form the mixed fluid of the water and the air. In the ejector 4, an air amount adjusting valve 5 serving as a gas amount adjusting valve is coupled to a suction pipe for taking in air. With the air amount adjusting valve 5, the amount of air sucked is adjusted, and thus the amount of air mixed with the ejector 4 into the raw material water is adjusted.

The cascade pump 6 pressure feeds the mixed fluid to the first ultrafine bubble manufacturing unit 2A and the second ultrafine bubble manufacturing unit 2B to achieve the function of manufacturing of ultrafine bubbles in the ultrafine bubble manufacturing units 2A and 2B. Although instead of the cascade pump 6, for example, another pump such as a whirlpool pump may be used as the second pump, a centrifugal pump is preferably used.

Figure 2:
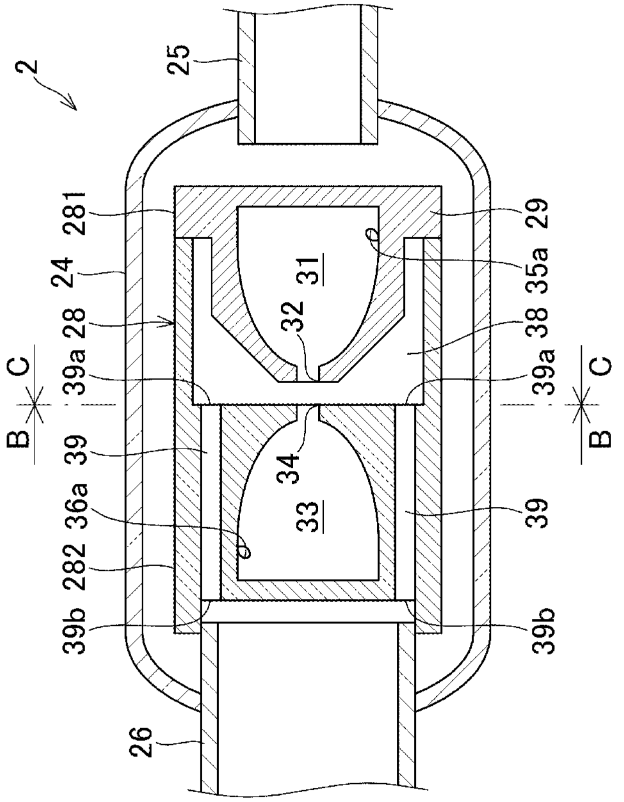
FIG. 2 is a vertical cross-sectional view of an ultrafine bubble manufacturing unit according to the embodiment of the present invention.
Figure 3:
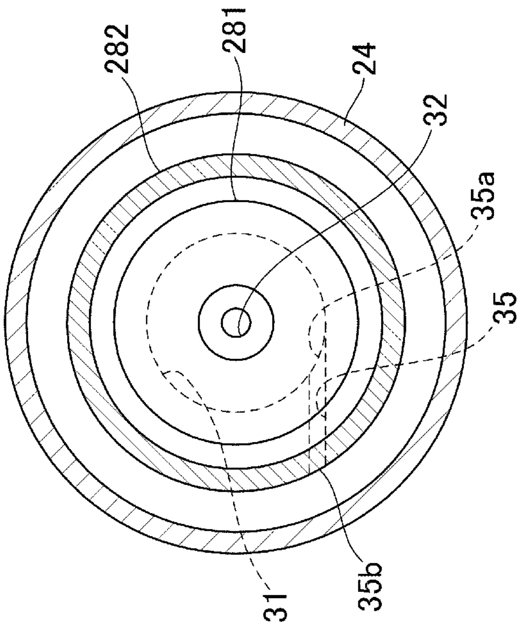
FIG. 3 is a horizontal cross-sectional view of the ultrafine bubble manufacturing unit seen in the direction of arrows B in FIG. 2.
Figure 4:
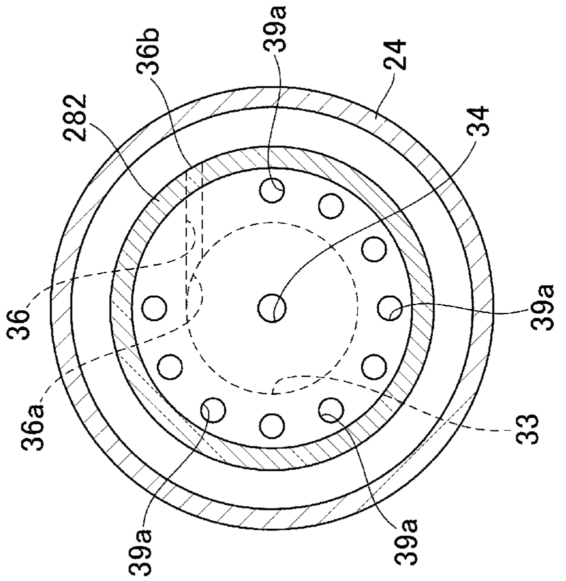
FIG. 4 is a horizontal cross-sectional view of the ultrafine bubble manufacturing unit seen in the direction of arrows C in FIG. 2.

FIG. 2 is a schematic vertical cross-sectional view showing the ultrafine bubble manufacturing unit 2 of the present embodiment. FIG. 3 is a cross-sectional view seen in the direction of arrows B in FIG. 2, and FIG. 4 is a cross-sectional view seen in the direction of arrows C in FIG. 2. The ultrafine bubble manufacturing unit 2 of FIGS. 2 to 4 indicates the structure of the first ultrafine bubble manufacturing unit 2A and the second ultrafine bubble manufacturing unit 2B.

The ultrafine bubble manufacturing unit 2 finely reduces the mixed fluid of water and air supplied with a supply pipe 25, forms ultrafine bubble water containing ultrafine bubbles of air and emits the ultrafine bubble water from an emission pipe 26.

The ultrafine bubble manufacturing unit 2 includes: a substantially cylindrical casing 24; the supply pipe 25 which is connected to one end of the casing 24 to communicate with the interior of the casing 24; the emission pipe 26 which is connected to the other end of the casing 24; and a fine-reducing block 28 which is stored within the casing 24 and which is connected to an end of the emission pipe 26. The emission pipe 26 penetrates the other end of the casing 24 such that its end is inserted thereinto, and supports, within the casing 24, the fine-reducing block 28 coupled to the tip of the emission pipe 26.

The fine-reducing block 28 is cylindrical, and a first swirling chamber 31 and a second swirling chamber 33 into which the mixed fluid of water and air is guided and which serve as swirling flow forming portions are formed within the fine-reducing block 28. The first swirling chamber 31 and the second swirling chamber 33 each have a shape obtained by combining a flat cylinder and a half spheroid, the vertices of the half spheroid parts are opposite each other and thus the first swirling chamber 31 and the second swirling chamber 33 are formed coaxially and symmetrically with respect to each other. The fine-reducing block 28 and the first swirling chamber 31 and the second swirling chamber 33 within the fine-reducing block 28 are arranged coaxially with the casing 24. The fine-reducing block 28 is formed with a first block component 281 within which the first swirling chamber 31 is formed and a second block component 282 within which the second swirling chamber 33 is formed.

Figure 5:
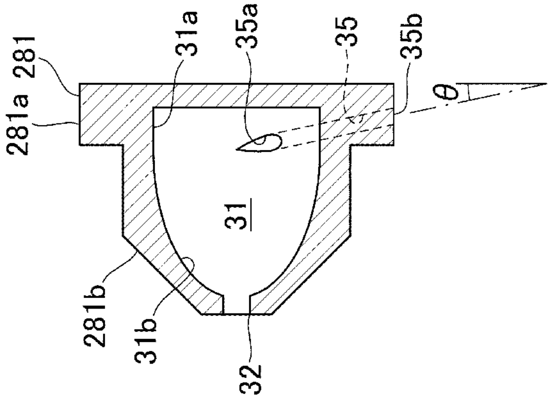
FIG. 5 is a cross-sectional view showing the first block of the ultrafine bubble manufacturing unit.

FIG. 5 is a cross-sectional view showing the first block component 281. The first block component 281 includes: a disk part 281*a* which forms one end surface of the fine-reducing block 28; and a protrusion part 281*b* which protrudes from the center portion of the disk part 281*a* toward the inside of the fine-reducing block 28. In the protrusion part 281*b*, a part close to the disk part 281*a* is formed cylindrically whereas a tip part distant from the disk part is formed in the shape of a truncated cone. Within the first block component 281, the first swirling chamber 31 is formed.

In the first swirling chamber 31, the wall surface 31*a* of a part on one end side is cylindrical whereas the wall surface

31*b* of a part on the other end side has a half spheroid shape. The wall surface 31*a* of the part on the one end side of the first swirling chamber 31 is formed substantially within the disk part of the first block component 281, and the wall surface 31*b* of the part on the other end side of the half spheroid shape is formed substantially within the protrusion part of the first block component 281. In the first block component 281, a first introduction path 35 is formed which introduces the mixed fluid between the casing 24 and the fine-reducing block 28 into the first swirling chamber 31. As shown in FIG. 3, the first introduction path 35 is formed in the direction of a tangent to the first swirling chamber 31. A discharge opening 35*a* which discharges the mixed fluid guided by the first introduction path 35 is formed in the wall surface of the first swirling chamber 31. An inflow opening 35*b* which makes the mixed fluid between the casing 24 and the fine-reducing block 28 flow into the first introduction path 35 is formed in the side surface of the disk part 281*a* of the first block component 281. As shown in FIG. 5, the first introduction path 35 is formed from one end toward the other end of the first swirling chamber 31 so as to form an angle θ with respect to a plane perpendicular to the center axis of the first swirling chamber 31. The angle θ of the first introduction path 35 with respect to the plane perpendicular to the center axis of the first swirling chamber 31 can be formed to be equal to or greater than 1° and equal to or less than 20°. The angle θ is preferably equal to or greater than 5° and equal to or less than 15° and further preferably equal to or greater than 8° and equal to or less than 12°. In the tip of the protrusion part 281*b* of the first block component 281, a first discharge hole 32 is formed, and a swirling flow of the mixed fluid formed in the first swirling chamber 31 is discharged from the first discharge hole 32.

Figure 6:
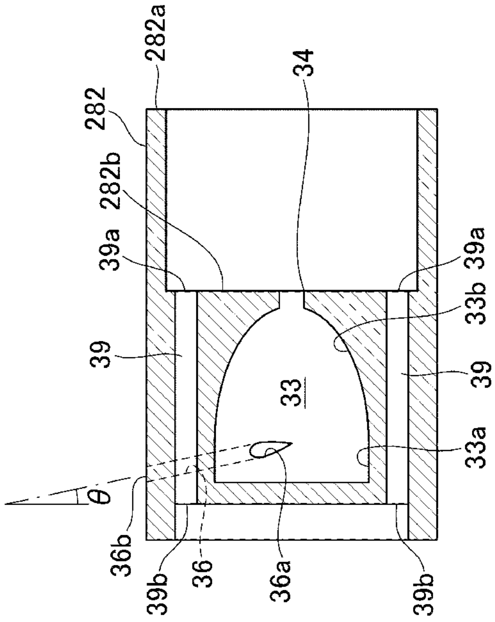
FIG. 6 is a cross-sectional view showing the second block of the ultrafine bubble manufacturing unit.

FIG. 6 is a cross-sectional view showing the second block component 282. The second block component 282 has a cylindrical shape having a bottom in which the thick bottom is formed on one end side and in which the other end is open. The protrusion part 281*b* of the first block component 281 is inserted from the opening of the second block component 282, and thus the disk part 281*a* of the first block component 281 is coupled to the other end surface 282*a*. Between the inside surface of the second block component 282 and the outside surface of the protrusion part 281*b* of the first block component 281, a collision chamber 38 is formed in which the swirling flow from the first swirling chamber 31 collides with a swirling flow from the second swirling chamber 33. Within the second block component 282, the second swirling chamber 33 is formed.

In the second swirling chamber 33, the wall surface 33*a* of a part on one end side is cylindrical whereas the wall surface 33*b* of a part on the other end side has a half spheroid shape. In the second block component 282, a second introduction path 36 is formed which introduces the mixed fluid between the casing 24 and the fine-reducing block 28 into the second swirling chamber 33. As shown in FIG. 4, the second introduction path 36 is formed in the direction of a tangent to the second swirling chamber 33. A discharge opening 36*a* which discharges the mixed fluid guided by the second introduction path 36 is formed in the wall surface of the second swirling chamber 33. An inflow opening 36*b* which makes the mixed fluid between the casing 24 and the fine-reducing block 28 flow into the second introduction path 36 is formed in a side surface on one end side of the second block component 282. As shown in FIG. 6, the second introduction path 36 is formed from one end toward the other end of the second swirling chamber 33 so as to form an angle θ with respect to a plane perpendicular to the center axis of the second swirling chamber 33. The angle θ of the second introduction path 36 with respect to the plane perpendicular to the center axis of the second swirling chamber 33 can be formed to be equal to or greater than 1° and equal to or less than 20°. The angle θ is preferably equal to or greater than 5° and equal to or less than 15° and further preferably equal to or greater than 8° and equal to or less than 12°. In the other end of the second block component 282, a second discharge hole 34 is formed, and the swirling flow of the mixed fluid formed in the second swirling chamber 33 is discharged from the second discharge hole 34. The swirling flow formed in the second swirling chamber 33 is formed to swirl in a direction opposite to the swirling flow formed in the first swirling chamber 31. As described above, the first swirling chamber 31 and the second swirling chamber 33 are formed symmetrically with respect to the plane perpendicular to the center axis, the first discharge hole 32 and the second discharge hole 34 are arranged opposite each other and the first swirling chamber 31 and the second swirling chamber 33 are formed to generate the swirling flows which swirl in the directions opposite to each other. In a part of the bottom of the second block component 282 on an outside diameter side, a plurality of emission passages 39 are formed which extend parallel to the center axis of the second block component 282. The emission passages 39 are arranged on the outside diameter side of the second swirling chamber 33 so as to surround the second swirling chamber 33. In the bottom surface 282*b* of the second block component 282, inflow openings 39*a* are formed that serve as a plurality of inflow ports through which the fluid in the collision chamber 38 is made to flow into the emission passages 39. The bottom surface 282*b* in which the inflow openings 39*a* are formed corresponds to a collision chamber surface which faces the collision chamber 38. In one end surface of the second block component 282, discharge openings 39*b* are formed that serve as a plurality of emission ports through which the fluid guided by the emission passages 39 are discharged. One end of the second block component 282 is coupled to the emission pipe 26, and thus the fluid discharged from the discharge openings 39*b* of the emission passages 39 flows into the emission pipe 26.

In the ultrafine bubble manufacturing unit 2, the mixed fluid of water and air is pressure fed with the cascade pump 6 to flow into the casing 24 from the supply pipe 25 serving as parts of the return path 7 and the emission path 8 on the upstream side of the ultrafine bubble manufacturing unit 2. The mixed fluid flowing into the casing 24 is guided from the inflow openings 35*b* and 36*b* in the outside surface of the fine-reducing block 28 into the first and second introduction paths 35 and 36. The mixed fluid guided by the first introduction path 35 is discharged from the discharge opening 35*a* into the first swirling chamber 31 to form the swirling flow within the first swirling chamber 31. The first introduction path 35 extends in the direction of the tangent to the first swirling chamber 31 and forms the inclination angle θ toward the other end of the first swirling chamber 31, and thus the stable swirling flow is formed within the first swirling chamber 31. The mixed fluid guided by the second introduction path 36 is discharged from the discharge opening 36*a* into the second swirling chamber 33 to form the swirling flow within the second swirling chamber 33. The second introduction path 36 extends in the direction of the tangent to the second swirling chamber 33 and forms the inclination angle θ toward the other end of the second swirling chamber 33, and thus the stable swirling flow is formed within the second swirling chamber 33.

The swirling flow of the mixed fluid within the first swirling chamber 31 is discharged from the first discharge hole 32 into the collision chamber 38, and the swirling flow within the second swirling chamber 33 is discharged from the second discharge hole 34 into the collision chamber 38. These swirling flows discharged from the first discharge hole 32 and the second discharge hole 34 swirl in the directions opposite to each other, and thus the swirling flows collide with each other within the collision chamber 38 while producing a large impact force. Consequently, the gases of the individual mixed fluids are effectively finely reduced to generate ultrafine bubbles. The water containing the ultrafine bubbles of air generated in this way is passed from the collision chamber 38 through the inflow openings 39*a*, is guided into the emission passages 39 and is emitted from the discharge openings 39*b* to the emission pipe 26. The emission pipe 26 is on the downstream side of the ultrafine bubble manufacturing unit 2 in the return path 7 and the emission path 8.

The water containing the ultrafine bubbles of air generated in this way with the ultrafine bubble manufacturing unit 2 is guided to the downstream side of the return path 7 and the emission path 8. Specifically, the water containing the ultrafine bubbles of air flows from the first ultrafine bubble manufacturing unit 2A to the downstream side of the return path 7, and the water containing the ultrafine bubbles of air flows from the second ultrafine bubble manufacturing unit 2B to the downstream side of the emission path 8. The bubbles manufactured in the ultrafine bubble manufacturing unit 2 are not limited to only the ultrafine bubbles, and include the microbubbles according to operating conditions or only the microbubbles may be manufactured.

The control device 13 is connected to an input portion 15 to which the diameter, the concentration and the flow rate of bubbles in bubble water that needs to be emitted from the emission path 8 are input. The control device 13 adjusts, based on the measurement value of the concentration meter 10, the degree of opening of the air amount adjusting valve 5, a discharge flow rate in the whirlpool pump 3, a discharge flow rate in the cascade pump 6 and the degree of opening of the flow rate adjusting valve 9 such that the concentration of the bubble water from the emission path 8 is the concentration input to the input portion 15. For example, when the measurement value of the concentration of the ultrafine bubbles measured with the concentration meter 10 is lower than a target value, the degree of opening of the flow rate adjusting valve 9 is increased, and thus a flow rate in the return path 7 is increased, with the result that the concentration of the ultrafine bubbles in the water emitted from the emission path 8 is increased. On the other hand, when the measurement value of the concentration of the ultrafine bubbles measured with the concentration meter 10 is higher than the target value, the degree of opening of the flow rate adjusting valve 9 is lowered, and thus the flow rate in the return path 7 is reduced, with the result that the concentration of the ultrafine bubbles in the water emitted from the emission path 8 is lowered.

The degree of opening of the flow rate adjusting valve 9 is adjusted, and thus it is possible to adjust the concentration of the bubbles including the ultrafine bubbles and the microbubbles emitted from the emission path 8, the diameter and the distribution of the bubbles and the amount of water emitted. For example, when the degree of opening of the flow rate adjusting valve 9 is increased, the concentration of the bubbles from the emission path 8 is increased, the diameter of the bubbles is reduced and the amount of water emitted from the emission path 8 is reduced. At the same time, the standard deviation of the diameters of the bubbles generated is reduced, the width of the distribution is reduced and thus the diameters of the bubbles are collected in a narrow range of relatively small values. On the other hand, when the degree of opening of the flow rate adjusting valve 9 is reduced, the concentration of the bubbles from the emission path 8 is reduced, and the diameter of the bubbles is increased, with the result that the amount of water emitted from the emission path 8 is increased. At the same time, the standard deviation of the diameters of the bubbles generated is extended, the width of the distribution is extended and thus the diameters of the bubbles are scattered in a wide range from relatively small values to large values.

The control device 13 also adjusts, based on the measurement value of the second pressure gauge 12, a discharge pressure in the cascade pump 6 to be able to adjust the concentration of the bubbles including the ultrafine bubbles and the microbubbles emitted from the emission path 8, the diameter of the bubbles and the amount of water including the ultrafine bubbles and/or the microbubbles which is emitted. For example, when a pressure on the discharge side of the cascade pump 6 exceeds 1 MPa, the discharge pressure in the cascade pump 6 is increased, and thus the concentration of the bubbles is lowered and the diameter of the bubbles is extended, with the result that the amount of water emitted from the emission path 8 is increased. On the other hand, when the discharge pressure in the cascade pump 6 is reduced, the concentration of the bubbles is increased and the diameter of the bubbles is reduced, with the result that the amount of water emitted from the emission path 8 is reduced. By contrast, when the pressure on the discharge side of the cascade pump 6 is less than 1 MPa, the discharge pressure in the cascade pump 6 is increased so as not to exceed 1 MPa, and thus the concentration of the bubbles is increased and the diameter of the bubbles is reduced, with the result that the amount of water emitted from the emission path 8 is increased. On the other hand, the discharge pressure in the cascade pump 6 is reduced, and thus the concentration of the bubbles is lowered and the diameter of the bubbles is increased, with the result that the amount of water emitted from the emission path 8 is reduced. The control device 13 can adjust the discharge pressure in the cascade pump 6 according to the relationship between the discharge pressure in the cascade pump 6 and the concentration of the bubbles described above based on the measurement value of the second pressure gauge 12 such that the measurement value of the concentration meter 10 is the desired concentration.

When the discharge pressure in the cascade pump 6 is adjusted, it is necessary to consider a difference between the discharge pressure and the discharge flow rate in the whirlpool pump 3. For example, when the discharge flow rate in the whirlpool pump 3 is increased to approach a sucked amount in the cascade pump 6, the discharge flow rate and the discharge pressure in the cascade pump 6 are unstable. Even when the discharge flow rate in the whirlpool pump 3 is reduced, and thus a difference between the discharge flow rate in the whirlpool pump 3 and the discharge flow rate in the cascade pump 6 is increased, the discharge flow rate and the discharge pressure in the cascade pump 6 are unstable. When the discharge flow rate in the whirlpool pump 3 is low, the air mixing capacity of the ejector 4 is lowered. In order to prevent the disadvantages as described above, the control device 13 preferably controls the discharge flow rate in the whirlpool pump 3 and the sucked amount in the cascade pump 6 such that the measurement value of the first pressure gauge 11 provided between the discharge side of the whirlpool pump 3 and the suction side of the cascade pump 6 is equal to or less than a predetermined reference pressure. As the value of the reference pressure, for example, 0.2 MPa can be adopted.

The control device 13 adjusts the degree of opening of the air amount adjusting valve 5 for the ejector 4 to be able to adjust the distribution of the bubbles in the water emitted from the emission path 8. In other words, the degree of opening of the air amount adjusting valve 5 is increased, and thus the ratio of bubbles having large particle diameters is increased. On the other hand, the degree of opening of the air amount adjusting valve 5 is reduced, and thus the ratio of bubbles having large particle diameters is reduced. For example, when the air amount adjusting valve 5 is used to set the amount of air mixed with the ejector 4 into the raw material water to 0.4 L/min, the ratio of bubbles which are emitted from the emission path 8 and whose diameters exceed 1 μm is increased, and thus the ultrafine bubbles and the microbubbles are generated. On the other hand, when the air amount adjusting valve 5 is used to set the amount of air mixed with the ejector 4 to 0.1 L/min, the diameters of almost all of the bubbles emitted from the emission path 8 drop below 1 μm, and thus substantially only the ultrafine bubbles are generated.

With consideration given to the characteristics as described above, the control device 13 adjusts the degree of opening of the air amount adjusting valve 5, the discharge flow rate in the whirlpool pump 3, the discharge flow rate in the cascade pump 6 and the degree of opening of the flow rate adjusting valve 9 so as to achieve the diameter and the concentration of the bubbles and the flow rate of the bubble water input to the input portion 15. In this way, it is possible to manufacture the bubble water having the desired concentration of the bubbles, the desired diameter of the bubbles and the desired amount of water emitted.

In the ultrafine bubble water manufacturing device 1, a second flow rate adjusting valve may be provided on the upstream side of the second ultrafine bubble manufacturing unit 2B in the emission path 8, and thus the diameter and the concentration of the ultrafine bubbles emitted from the emission path 8 may be adjusted by adjusting the degree of opening of the second flow rate adjusting valve, the degree of opening of the air amount adjusting valve 5, the degree of opening of the flow rate adjusting valve 9 in the return path 7 and the discharge pressures in the whirlpool pump 3 and the cascade pump 6.

Table 1 below indicates the results of an experiment in which the ultrafine bubble water manufacturing device 1 of the present embodiment was used to manufacture bubble water containing ultrafine bubbles of air. This experiment was performed by setting two types of degrees of opening of the air amount adjusting valve 5 and three types of degrees of opening of the flow rate adjusting valve 9. The two types of degrees of opening of the air amount adjusting valve 5 were such a degree of opening that the amount of air supplied to the ejector 4 was 0.1 L/min and such a degree of opening that the amount of air was 0.4 L/min. The degrees of opening of the flow rate adjusting valve 9 were a large degree of opening which was full opening, a medium degree of opening which was 3.5% of full opening and a small degree of opening which was 0.8% of full opening. The ultrafine bubble water manufacturing device 1 was operated under individual conditions, and then the pressure of the branch portion P, the flow rate of water emitted from the emission path 8 and the average particle diameter, the most frequent particle diameter, the standard deviation and the concentration of bubbles included in the emitted water were measured. The measurements of the bubbles were performed with a nano particle analyzer NanoSIGHT NS500 made by Quantum Design Japan, Inc. The average particle diameter, the most frequent particle diameter, the standard deviation and the concentration of the bubbles were measured on bubble water emitted from the emission path 8 and stored in a storage chamber.

TABLE 1

| Number | Amount of air (L/min) | Degree of opening of valve 9 | Pressure of branch portion (MPa) | Emission flow rate (L/min) | Average particle diameter (nm) | Most frequent particle diameter (nm) | Standard deviation (nm) | Concentration (pieces/mL) |
|---|---|---|---|---|---|---|---|---|
| 1 | 0.1 | Large | 0.85 | 10.4 | 103.7 | 79.6 | 46.3 | $1.96 \times 10^8$ |
| 2 | 0.1 | Medium | 1.00 | 11.6 | 118.0 | 89.6 | 57.8 | $1.83 \times 10^8$ |
| 3 | 0.1 | Small | 1.20 | 12.4 | 112.5 | 97.9 | 49.3 | $1.52 \times 10^8$ |
| 4 | 0.4 | Large | 0.85 | 10.4 | 114.3 | 73.7 | 45.7 | $2.76 \times 10^8$ |
| 5 | 0.4 | Medium | 1.00 | 11.6 | 115.3 | 79.1 | 49.4 | $2.90 \times 10^8$ |
| 6 | 0.4 | Small | 1.20 | 12.4 | 109.5 | 85.0 | 45.1 | $2.55 \times 10^8$ |

As understood from table 1, under almost all conditions 1 to 6, most of the particle diameters of the bubbles produced were 70 to 90 nm, and they hardly depended on the pressure of the branch portion P and the amount of air sucked by the ejector 4. The concentration of the bubbles was proportional to the amount of air sucked. As the degree of opening of the flow rate adjusting valve 9 was reduced, the pressure of the branch portion P was increased, and the flow rate in the return path 7 was decreased, the diameter of the bubbles was increased, the concentration of the bubbles was lowered and the amount of bubble water manufactured was increased. When the flow rate in the return path 7 was increased, ultrafine bubbles were obtained in which the diameter of the bubbles was small, the concentration of the bubbles was high and a small variation in the diameter was produced. When the amount of air was 0.4 L/min, whitish bubble water was emitted whereas when the amount of air was 0.1 L/min, the bubble water was transparent. Hence, when the amount of air was 0.4 L/min, as compared with a case where the amount of air was 0.1 L/min, a high content of the microbubbles is said to have been provided. Since the average particular diameter and the like of the bubbles were measured after a given amount of bubble water was stored in the storage chamber, measurement values on the bubble water in which the amount of air was 0.4 L/min were not reflected on the microbubbles which caused the whitish bubble water.

Figure 7:
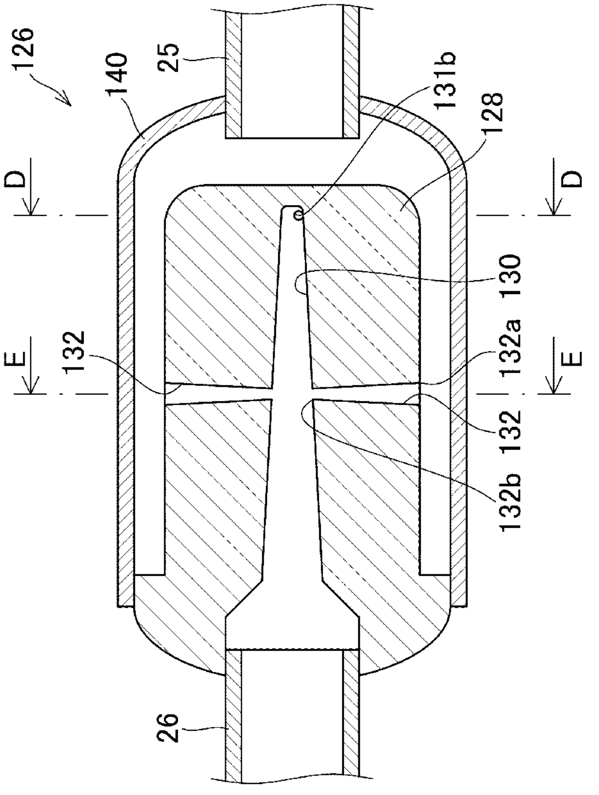
FIG. 7 is a vertical cross-sectional view showing another ultrafine bubble manufacturing unit.
Figure 8:
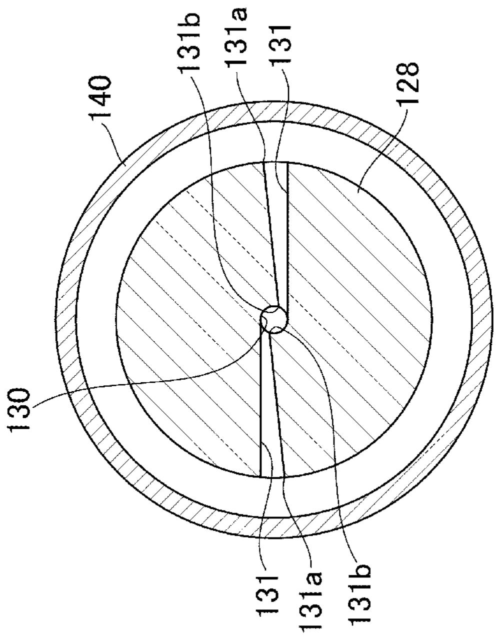
FIG. 8 is a horizontal cross-sectional view of the ultrafine bubble manufacturing unit seen in the direction of arrows D in FIG. 7.
Figure 9:
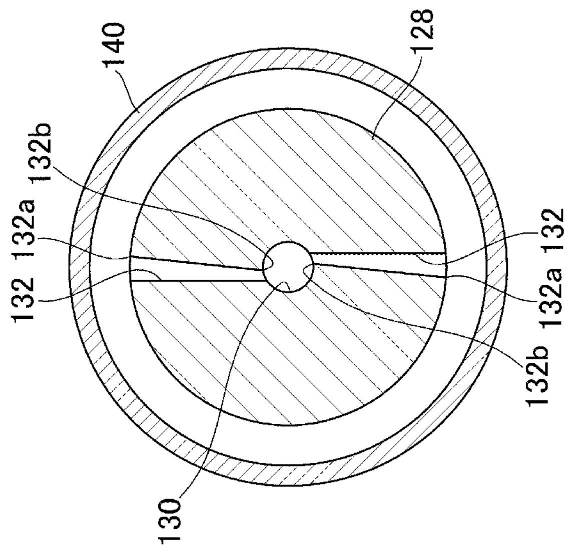
FIG. 9 is a horizontal cross-sectional view of the ultrafine bubble manufacturing unit seen in the direction of arrows E in FIG. 7.

Although in the embodiment described above, the ultrafine bubble manufacturing unit 2 includes the fine-reducing block 28 including the first swirling chamber 31 and the second swirling chamber 33 formed coaxially and symmetrically with respect to the plane perpendicular to the center axis, another ultrafine bubble manufacturing unit may be used. FIG. 7 is a vertical cross-sectional view showing an ultrafine bubble manufacturing unit of a variation. FIG. 8 is a cross-sectional view seen in the direction of arrows D in FIG. 7, and FIG. 9 is a cross-sectional view seen in the direction of arrows E in FIG. 7. The ultrafine bubble manufacturing unit 126 finely reduces the mixed fluid of water and air supplied with the supply pipe 25 in a fine-reducing block 128 to form ultrafine bubble water containing ultrafine bubbles of air, and emits the ultrafine bubble water from the emission pipe 26.

The ultrafine bubble manufacturing unit 126 includes a substantially cylindrical casing 140 in which one end is coupled to the supply pipe 25 and in which the other end is coupled to the fine-reducing block 128. The fine-reducing block 128 has a substantially cylindrical shape with a smaller diameter than the casing 140, and the other end thereof is formed to have a larger diameter than the other parts and is fitted to the inside surface of the other end of the casing 140. A treatment flow path 130 through which the mixed fluid of water and a gas is guided, a first eccentric supply path 131 which communicates with the upstream end of the treatment flow path 130 and which serves as the swirling flow forming portion and a second eccentric supply path 132 which communicates with an approximate center of the treatment flow path 130 in its length direction and which serves as the swirling flow forming portion are formed within the fine-reducing block 128. In a cross section passing through the center axis of the treatment flow path 130, the center axis of the first eccentric supply path 131 and the center axis of the second eccentric supply path 132 extend perpendicular to the center axis of the treatment flow path 130.

The treatment flow path 130 of the fine-reducing block 128 is formed along the center axis of the fine-reducing block 128 from near one end surface of the fine-reducing block 128 to the other end surface of the fine-reducing block 128. One end of the treatment flow path 130 is present within the fine-reducing block 128 without penetrating the one end surface of the fine-reducing block 128 whereas the other end of the treatment flow path 130 is open to the other end surface of the fine-reducing block 128. The treatment flow path 130 has a circular cross section, and is formed such that its diameter is increased as the treatment flow path 130 extends from the one end toward the other end. The emission pipe 26 is inserted into the opening of the other end of the treatment flow path 130, and thus the treatment flow path 130 communicates with the emission pipe 26.

As shown in FIG. 8, which is a cross-sectional view perpendicular to the center axis of the fine-reducing block 128, the two first eccentric supply paths 131 of the fine-reducing block 128 are formed to communicate with the one end of the treatment flow path 130. The two first eccentric supply paths 131 are arranged symmetrically with respect to a point which is the center of the treatment flow path 130. The first eccentric supply paths 131 extend substantially in the radial direction of the fine-reducing block 128, inflow openings 131*a* are formed in the outer circumferential surface of the fine-reducing block 128 and discharge openings 131*b* are formed in the inner circumferential surface of the treatment flow path 130. The first eccentric supply paths 131 each have a circular cross section and are formed such that the diameters thereof are decreased as the first eccentric supply paths 131 extend from the inflow openings 131*a* toward the discharge openings 131*b*. The discharge openings 131*b* of the first eccentric supply paths 131 are arranged in positions eccentric to the center of the treatment flow path 130 when seen in the axial direction of the treatment flow path 130. Here, in FIG. 7, the second eccentric supply paths 132 indicate vertical cross-sectional shapes along the center axis of the second eccentric supply paths 132 and do not indicate a state where the second eccentric supply paths 132 are cut along a plane passing through the center axis of the fine-reducing block 128.

As shown in FIG. 9, which is a cross-sectional view perpendicular to the center axis of the fine-reducing block 128, the two second eccentric supply paths 132 of the fine-reducing block 128 are formed to communicate with the approximate center of the treatment flow path 130 in its length direction. The two second eccentric supply paths 132 are arranged symmetrically with respect to a point which is the center of the treatment flow path 130. The second eccentric supply paths 132 extend substantially in the radial direction of the fine-reducing block 128, inflow openings 132*a* are formed in the outer circumferential surface of the fine-reducing block 128 and discharge openings 132*b* are formed in the inner circumferential surface of the treatment flow path 130. The second eccentric supply paths 132 each have a circular cross section and are formed such that the diameters thereof are decreased as the second eccentric supply paths 132 extend from the inflow openings 132*a* toward the discharge openings 132*b*. The discharge openings 132*b* of the second eccentric supply paths 132 are arranged in positions eccentric to the center of the treatment flow path 130 when seen in the axial direction of the treatment flow path 130. The discharge openings 132*b* of the second eccentric supply paths 132 are eccentric to the center axis of the treatment flow path 130 on a side opposite to the discharge openings 131*b* of the first eccentric supply paths 131. The first eccentric supply paths 131 and the second eccentric supply paths 132 of the fine-reducing block 128 are arranged to form an angle of 90° with respect to each other when seen in the axial direction of the fine-reducing block 128.

The ultrafine bubble manufacturing unit 126 configured as described above is operated as follows. The mixed fluid of water and air is first guided through the supply pipe 25 into the casing 140. The mixed fluid flowing into the casing 140 is guided from the inflow openings 131*a* and 132*a* in the outside surface of the fine-reducing block 128 into the first and second eccentric supply paths 131 and 132. The mixed fluid guided by the first eccentric supply paths 131 is discharged from the discharge openings 131*b* into the treatment flow path 130 so as to form a swirling flow within the treatment flow path 130. The discharge openings 131*b* of the first eccentric supply paths 131 are arranged in the positions eccentric to the center of the treatment flow path 130, and thus the stable swirling flow is formed within the treatment flow path 130. The mixed fluid guided from the first eccentric supply paths 131 into the treatment flow path 130 in this way forms into the swirling flow to flow from the one end to the other end of the treatment flow path 130. The mixed fluid guided by the second eccentric supply paths 132 is discharged from the discharge openings 132*b* into the treatment flow path 130. The discharge openings 132*b* of the second eccentric supply paths 132 are arranged in the positions eccentric to the center axis of the treatment flow path 130 and are eccentric on the side opposite to the discharge openings 131*b* of the first eccentric supply paths 131, and thus a swirling flow in a direction opposite to the swirling flow flowing through the treatment flow path 130 is formed. The swirling flow of the mixed fluid discharged from the discharge openings 132*b* of the second eccentric supply paths 132 collides with the swirling flow flowing from the first eccentric supply paths 131. Consequently, the gases of the individual mixed fluids are effectively finely reduced to generate ultrafine bubbles. The water containing the ultrafine bubbles of air generated in this way flows toward the other end of the treatment flow path 130, is passed through the emission pipe 26 and is emitted from the ultrafine bubble manufacturing unit 126.

In the ultrafine bubble manufacturing unit 126 of the variation described above, when the fine-reducing block 128 is manufactured, the treatment flow path 130, the first eccentric supply paths 131 and the second eccentric supply paths 132 can be formed by cutting processing on a single metal material. Hence, it is possible to easily manufacture the fine-reducing block 128 in a small number of steps.

Although in the ultrafine bubble manufacturing unit 126 of the variation described above, the first eccentric supply paths 131 and the second eccentric supply paths 132 of the fine-reducing block 128 are arranged to form an angle of 90° with respect to each other when seen in the axial direction of the treatment flow path 130, they may be arranged to form an angle of 0° with respect to each other. Although the two first eccentric supply paths 131 and the two second eccentric supply paths 132 of the fine-reducing block 128 are provided, in either or each of the first eccentric supply path 131 and the second eccentric supply path 132, only one piece may be provided.

Figure 10:
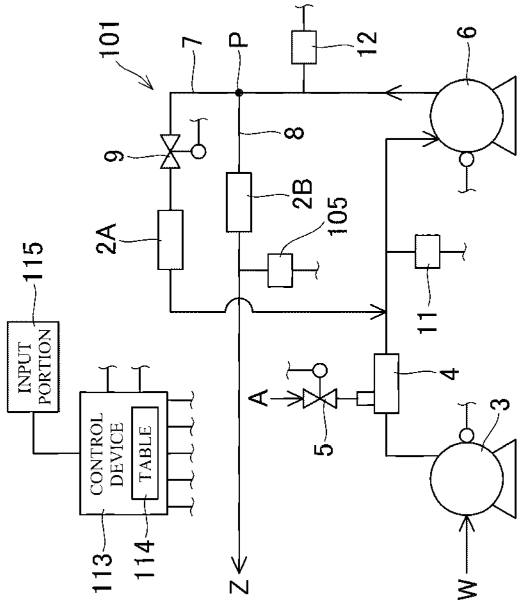
FIG. 10 is a schematic view showing an ultrafine bubble water manufacturing device according to a second embodiment.

FIG. 10 is a schematic view showing an ultrafine bubble water manufacturing device 101 according to a second embodiment of the present invention. The ultrafine bubble water manufacturing device 101 of the second embodiment differs from the ultrafine bubble water manufacturing device 1 of the first embodiment in that a thermometer 105 is provided on the downstream side of the second ultrafine bubble manufacturing unit 2B and that a control device 113 performs control based on a table 114. In the second embodiment, the same parts as in the first embodiment are identified with the same reference numerals, and detailed description thereof will be omitted.

In the ultrafine bubble water manufacturing device 101 of the second embodiment, the control device 113 includes the table 114 in which the diameters, the concentrations and the flow rates of bubbles in bubble water emitted from the emission path 8 are stored so as to correspond to possible values of the loads of the whirlpool pump 3 and the cascade pump 6, the degree of opening of the air amount adjusting valve 5, the degree of opening of the flow rate adjusting valve 9, the measurement value of the thermometer 105 and the measurement values of the first pressure gauge 11 and the second pressure gauge 12. As the table 114, for example, a table can be used which is obtained by adding, to the details of table 1, the loads of the whirlpool pump 3 and the cascade pump 6 when the ultrafine bubble water manufacturing device 101 is operated under the individual conditions. The loads of the whirlpool pump 3 and the cascade pump 6 can be determined based on current values supplied to the pumps. An input portion 115 for inputting the diameter, the concentration and the flow rate of bubbles in bubble water which needs to be emitted from the emission path 8 is connected to the control device 113.

When the ultrafine bubble water manufacturing device 101 of the present embodiment is operated, the diameter, the concentration and the flow rate of bubbles which need to be emitted from the emission path 8 are input through the input portion 115. The control device 113 refers to the table 114 to identify, as target values, the loads of the whirlpool pump 3 and the cascade pump 6, the degree of opening of the air amount adjusting valve 5 and the degree of opening of the flow rate adjusting valve 9 corresponding to the diameter, the concentration and the flow rate of bubbles in bubble water which are input. The control device 113 controls the whirlpool pump 3, the cascade pump 6, the air amount adjusting valve 5 and the flow rate adjusting valve 9 so as to achieve the target values of the loads of the whirlpool pump 3 and the cascade pump 6, the degree of opening of the air amount adjusting valve 5 and the degree of opening of the flow rate adjusting valve 9 which are identified. The control device 113 also detects the temperature of the water emitted from the second ultrafine bubble manufacturing unit 2B from the measurement value of the thermometer 105, and refers to the table 114 based on the measured temperature to adjust the loads of the whirlpool pump 3 and the cascade pump 6, the degree of opening of the air amount adjusting valve 5 and the degree of opening of the flow rate adjusting valve 9. The control device 113 further refers to the table 114 based on the measurement values of the first pressure gauge 11 and the second pressure gauge 12 to adjust the loads of the whirlpool pump 3 and the cascade pump 6, the degree of opening of the air amount adjusting valve 5 and the degree of opening of the flow rate adjusting valve 9.

In this way, the ultrafine bubble water manufacturing device 101 of the second embodiment controls the loads of the whirlpool pump 3 and the cascade pump 6, the degree of opening of the air amount adjusting valve 5 and the degree of opening of the flow rate adjusting valve 9 based on the table 114 and the diameter, the concentration and the flow rate of bubbles in bubble water which needs to be emitted from the emission path 8 without measuring the diameter and the concentration of bubbles emitted from the emission path 8, and thereby can manufacture ultrafine bubble water having the diameter, the concentration and the flow rate which are desired.

Although in the second embodiment, the control device 113 checks the diameter, the concentration and the flow rate of bubbles in bubble water which needs to be emitted from the emission path 8 against the table 114 so as to identify the loads of the whirlpool pump 3 and the cascade pump 6, the degree of opening of the air amount adjusting valve 5 and the degree of opening of the flow rate adjusting valve 9, the control device 113 may use a function in which the diameter, the concentration and the flow rate of bubbles in bubble water are set to parameters so as to identify the loads of the whirlpool pump 3 and the cascade pump 6, the degree of opening of the air amount adjusting valve 5 and the degree of opening of the flow rate adjusting valve 9.

The first pressure gauge 11 and the second pressure gauge 12 do not necessarily need to be provided, and the adjustment based on the measurement values of the first pressure gauge 11 and the second pressure gauge 12 does not necessarily need to be performed. In this case, information on the measurement values of the first pressure gauge 11 and the second pressure gauge 12 is not necessary for the table 114.

Although the thermometer 105 is arranged on the emission side of the second ultrafine bubble manufacturing unit 2B, when the whirlpool pump 3 sucks water from a water tank, the thermometer 105 may be arranged in this water tank to measure the temperature of water in the water tank. The thermometer 105 does not necessarily need to be provided, and the adjustment based on the measurement value of the thermometer 105 does not necessarily need to be performed. In this case, information on the measurement value of the thermometer 105 is not necessary for the table 114.

Although in the first and second embodiments, the branch portion P is provided on the downstream side of the cascade pump 6, and the return path 7 in which the first ultrafine bubble manufacturing unit 2A and the flow rate adjusting valve 9 are interposed and the emission path 8 in which the second ultrafine bubble manufacturing unit 2B is interposed are connected to the branch portion P, the flow rate adjusting valve 9, the first ultrafine bubble manufacturing unit 2A and the return path 7 do not need to be provided. In other words, on the downstream side of the cascade pump 6, only the emission path 8 in which the second ultrafine bubble manufacturing unit 2B is interposed may be provided, and thus ultrafine bubbles may be generated with only the second ultrafine bubble manufacturing unit 2B.

Figure 11:
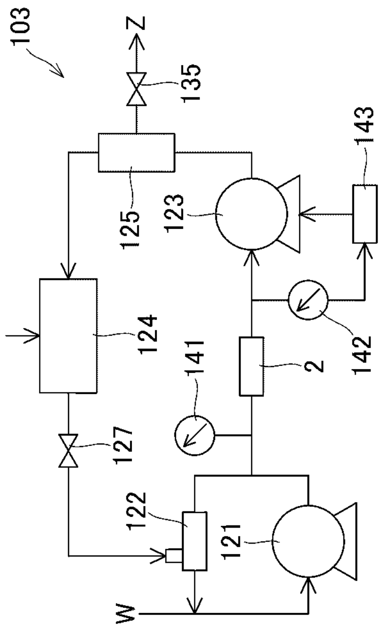
FIG. 11 is a schematic view showing an ultrafine bubble water manufacturing device according to a third embodiment.

FIG. 11 is a schematic view showing an ultrafine bubble water manufacturing device 103 according to a third embodiment of the present invention. The ultrafine bubble water manufacturing device 103 adds ultrafine bubbles of air into raw material water such as tap water supplied as indicated by an arrow W, and emits the water as indicted by an arrow Z.

The ultrafine bubble water manufacturing device 103 of the third embodiment includes a suction pump 121 as a first pump which sucks the tap water serving as the raw material water. An ejector 122 is provided in parallel to the suction pump 121 as a mixer which mixes air into the raw material water discharged from the suction pump 121 to form the mixed fluid of water and air. In other words, between the suction side and the discharge side of the suction pump 121, the ejector 122 is interposed. In the ejector 122, a mixed air amount adjusting valve 127 formed with a flow rate adjusting valve for adjusting the amount of air mixed into the mixed fluid is coupled to a suction pipe for taking in air. A gas tank 124 which stores air is connected to the upstream side of the mixed air amount adjusting valve 127. In the gas tank 124, a purification device which purifies air sucked from the atmosphere is preferably provided.

The ultrafine bubble manufacturing unit 2 which finely reduces the air of the mixed fluid to form ultrafine bubbles is connected to the downstream side of the suction pump 121. Instead of the ultrafine bubble manufacturing unit 2, the ultrafine bubble manufacturing unit 126 of the variation may be connected. Between the suction pump 121 and the ultrafine bubble manufacturing unit 2, a first liquid pressure sensor 141 is provided which measures the pressure of the liquid in the fluid guided by the ultrafine bubble manufacturing unit 2. On the downstream side of the ultrafine bubble manufacturing unit 2, a cascade pump 123 serving as a second pump for sucking the fluid is provided. Between the ultrafine bubble manufacturing unit 2 and the cascade pump 123, a second liquid pressure sensor 142 is provided which measures the pressure of the liquid in the fluid discharged from the ultrafine bubble manufacturing unit 2. Based on the measurement value of the second liquid pressure sensor 142, the operation of the cascade pump 123 is controlled by a control device 143.

A gas-liquid separator 125 which separates, from the water containing the ultrafine bubbles, excess air left without being added into water is connected to the downstream side of the cascade pump 123. The air separated with the gas-liquid separator 125 is returned to the gas tank 124 whereas the water containing the ultrafine bubbles is emitted through a flow rate adjusting valve 135 as indicted by the arrow Z. Here, as the first pump of the bubble water manufacturing device 103, in addition to an underwater pump, a volumetric pump such as a land pump may be used. Although as the second pump, a pump other than the cascade pump may be used, a centrifugal pump is preferably used.

The bubble water manufacturing device 103 of the third embodiment adjusts the degree of opening of the mixed air amount adjusting valve 127 and the discharge flow rates or the discharge pressures of the fluid in the suction pump 121 and the cascade pump 123, and thereby can adjust the particle diameter and the concentration of the ultrafine bubbles.

The bubble water manufacturing device 103 measures the concentration of the ultrafine bubbles emitted, adjusts, based on the measurement value thereof, discharged amounts in the suction pump 121 and the cascade pump 123 and the degree of opening of the mixed air amount adjusting valve 127 and thereby can adjust the concentration of the ultrafine bubbles in a bubble water tank 2.

In the bubble water manufacturing device 103, a second control device is provided, and the degree of opening of the mixed air amount adjusting valve 127 and the discharge flow rates or the discharge pressures of the fluid in the suction pump 121 and the cascade pump 123 are controlled by the second control device, with the result that the particle diameter and the concentration of the ultrafine bubbles emitted through the flow rate adjusting valve 135 may be adjusted.

For example, in order to decrease the diameter of air bubbles included in the ultrafine bubble water which is emitted, the degree of opening of the mixed air amount adjusting valve 127 is lowered to reduce the amount of air supplied to the ejector 122, and a pressure difference between the upstream side and the downstream side of the ultrafine bubble manufacturing unit 2 is increased.

On the other hand, in order to increase the concentration of air bubbles included in the ultrafine bubble water which is emitted, the degree of opening of the mixed air amount adjusting valve 127 is increased to increase the amount of air supplied to the ejector 122, and the pressure difference between the upstream side and the downstream side of the ultrafine bubble manufacturing unit 2 is increased.

In the ultrafine bubble manufacturing unit 2 of the bubble water manufacturing device 103, the discharged amount in the suction pump 121 and the sucked amount in the cascade pump 123 are preferably adjusted such that a pressure difference equal to or greater than 4 MPa and equal to or less than 6 MPa is produced between the upstream side and the downstream side, that is, between the pressure of the fluid in the supply pipe 25 and the pressure of the fluid in the emission pipe 26. In this case, the adjustment is made such that the pressure of the fluid in the supply pipe 25 is greater than the pressure of the fluid in the emission pipe 26. As described above, the pressure difference equal to or greater than 4 MPa and equal to or less than 6 MPa is produced between the upstream side and the downstream side of the ultrafine bubble manufacturing unit 2, and thus it is possible to stably manufacture the water containing the ultrafine bubbles with the ultrafine bubble manufacturing unit 2.

In this way, with the bubble water manufacturing device 103 of the third embodiment, it is possible to stably form the ultrafine bubbles of 50 to 70 nm. The bubble water manufacturing device 103 may manufacture water containing ultrafine bubbles of oxygen or hydrogen other than air. When the water containing the ultrafine bubbles of oxygen or hydrogen is manufactured, excess oxygen or hydrogen which is not added into water is separated with the gas-liquid separator 125 and is returned to the gas tank 124, with the result that it is possible to prevent oxygen or hydrogen from disadvantageously leaking to the outside of the bubble water manufacturing device 103. Hence, when the water containing the ultrafine bubbles of oxygen or hydrogen is manufactured, it is possible to effectively prevent disadvantages such as a fire caused by the leaking of oxygen or hydrogen.

Although in the embodiment described above, the fine-reducing block 28 of the ultrafine bubble manufacturing unit 2 includes the first swirling chamber 31 and the second swirling chamber 33 as the swirling flow forming portions, the number of swirling flow forming portions is not limited to two, and the fine-reducing block 28 may include three or more swirling flow forming portions. Although the fine-reducing block 128 of the ultrafine bubble manufacturing unit 126 includes the first eccentric supply paths 131 and the second eccentric supply paths 132 as the swirling flow forming portions, the number of swirling flow forming portions is not limited to two, and the fine-reducing block 128 may include three or more swirling flow forming portions.

Although in the embodiment described above, the ultrafine bubbles of air serving as a gas are formed in water, instead of air, ultrafine bubbles of various other types of gases such as hydrogen, oxygen, ozone, nitrogen and carbon dioxide may be formed.

Instead of water, ultrafine bubbles may be formed in slightly acidic electrolyzed water and various other types of liquids.

The ultrafine bubble water manufacturing devices 1, 101 and 103 of the first to third embodiments and the bubble water manufactured with the ultrafine bubble water manufacturing devices 1, 101 and 103 can be used in various applications utilizing ultrafine bubbles and/or microbubbles. For example, in industries such as environment-related industries, agriculture and livestock industries, food-related industries, fishing industries, electronics industries, medical and medical-related industries, energy-related industries, daily necessities-related industries, papermaking industries, shipbuilding industries and machine manufacturing industries, the ultrafine bubble water manufacturing devices 1, 101 and 103 and the bubble water can be utilized in various types of treatment or as constituent elements of products.

Examples of applications in the environment-related industries can include purification of soil, purification of water, wastewater treatment, sludge volume reduction, organic substance decomposition, removal of algae, removal of coagulated suspended substances and the like.

Examples of applications in the agriculture and livestock industries can include growth promotion of agricultural products and livestock products, yield increase and quality enhancement, freshness maintenance, utilization for drinking water and liquid fertilizers and the like.

Examples of applications in the food-related industries can include freshness maintenance, oxidation prevention, flavor addition, texture improvement, aroma addition and the like.

Examples of applications in the fishing industries can include growth promotion of fishing products, yield increase, quality enhancement, aquaculture environment improvement, freshness maintenance and the like.

Examples of applications in the electronics industries can include precision separation, cleaning of various types of materials and components such as a silicon wafer and the like.

Examples of applications in the medical and medical-related industries can include disinfection, sterilization, culture, manufacturing and treatment of chemicals and the like.

Examples of applications in the energy-related industries can include purification of raw materials and fuels, efficiency enhancement of fuels and the like.

Examples of applications in the daily necessities-related industries can include detergents, bath and kitchen utensils, water heaters, air conditioners, cosmetics and like.

Examples of applications in the papermaking industries can include sludge treatment and the like.

Examples of applications in the shipbuilding industries can include improvement of water quality in navigation water areas, purification of ballast water, production of a gas-liquid mixed fuel to be supplied to an engine and the like.

Examples of applications in the machine manufacturing industries can include purification of components, various types of purification devices, a manufacturing device for a gas-liquid mixed fuel and the like.

The industries and applications described above are only illustrative, and the present invention can be applied to various things and applications utilizing the qualities of ultrafine bubbles and/or microbubbles.

The present invention is not limited to the embodiments and examples described above, and many variations can be made within the technical ideas of the present invention by the person having ordinary knowledge in the art.

REFERENCE NUMERALS

1, 101, 103 ultrafine bubble water manufacturing device
2A first ultrafine bubble manufacturing unit
2B second ultrafine bubble manufacturing unit
3 whirlpool pump
4 ejector
5 air amount adjusting valve
6 cascade pump
7 return path
8 emission path
9 flow rate adjusting valve
10 concentration meter
11 first pressure gauge
12 second pressure gauge
13, 113 control device
15, 115 input portion
24 casing
25 supply pipe
26 emission pipe
28 fine-reducing block
31 first swirling chamber
32 first discharge hole
33 second swirling chamber
34 second discharge hole
35 first introduction path
36 second introduction path
38 collision chamber
39 emission passage
114 table of control device
126 ultrafine bubble manufacturing unit
105 thermometer
281 first block component
282 second block component

The invention claimed is:

1. An ultrafine bubble manufacturing unit for manufacturing gaseous ultrafine bubbles contained in water, the ultrafine bubble manufacturing unit comprising:

a casing having a circular cross section;

a supply pipe connected to one end of the casing, extending coaxially with the casing and supplying a mixed fluid of water and a gas;

a fine-reducing block having at least part stored within the casing and including a plurality of swirling flow forming portions each forming a swirling flow of the mixed fluid supplied from the supply pipe into the casing, the fine-reducing block causing the swirling flows formed in the swirling flow forming portions to collide with each other and finely reducing the gas in the mixed fluid so as to generate ultrafine bubble water; and an emission pipe arranged on a side of the other end of the casing to emit the ultrafine bubble water generated in the fine-reducing block to an outside of the casing, wherein the fine-reducing block includes:

a first swirling chamber serving as the swirling flow forming portion forming the swirling flow of the mixed fluid around a swirling axis coaxial with the casing;

a second swirling chamber formed on a side distant from the supply pipe with respect to the first swirling chamber and forming the swirling flow of the mixed fluid around the swirling axis coaxial with the casing, the swirling flow swirling in a direction opposite to the swirling flow formed in the first swirling chamber;

a collision chamber causing the swirling flow of the mixed fluid formed in the first swirling chamber and the swirling flow of the mixed fluid formed in the second swirling chamber to collide with each other; and an emission passage guiding, to a side of the emission pipe, the ultrafine bubble water produced by the collision of the swirling flows of the mixed fluid in the collision chamber, and wherein the emission pipe is coupled to the fine-reducing block to communicate with the emission passage so as to support the fine-reducing block within the casing.

2. The ultrafine bubble manufacturing unit according to claim 1, wherein the fine-reducing block includes a first block component including the first swirling chamber, a first introduction path introducing the mixed fluid within the casing into a side of one end of the first swirling chamber in a direction of a tangent to the first swirling chamber and a first discharge hole formed in the other end of the first swirling chamber and discharging the swirling flow and a second block component coupled to the first block component and including the second swirling chamber, a second introduction path introducing the mixed fluid within the casing into a side of one end of the second swirling chamber in a direction of a tangent to the second swirling chamber, a second discharge hole formed in the other end of the second swirling chamber opposite the first discharge hole of the first block component and discharging the swirling flow, a collision chamber surface coupled to the first block component and facing the collision chamber formed between the collision chamber surface and the first block component, an inflow port formed in the collision chamber surface and making the ultrafine bubble water in the collision chamber flow into the emission passage and an emission port formed in an end surface on a side opposite to a side having the first block component coupled and discharging the ultrafine bubble water flowing through the emission passage.

3. The ultrafine bubble manufacturing unit according to claim 2, wherein the first introduction path and the second introduction path are formed to be inclined with respect to a plane perpendicular to an axis of the fine-reducing block.

4. The ultrafine bubble manufacturing unit according to claim 1, wherein the fine-reducing block includes a treatment flow path formed in a direction coaxial with the casing to guide the mixed fluid, a first eccentric supply path introducing the mixed fluid into an upstream end of the treatment flow path in a direction eccentric to a center axis so as to form the swirling flow, the first eccentric supply path serving as the swirling flow forming portion and a second eccentric supply path introducing the mixed fluid into a downstream side with respect to the first eccentric supply path of the treatment flow path in a direction eccentric to the center axis and opposite to the first eccentric supply path so as to generate the swirling flow in a direction opposite to the swirling flow formed in the first eccentric supply path and to cause the swirling flows to collide with each other and the emission pipe is coupled to a downstream end of the treatment flow path in the fine-reducing block.

5. An ultrafine bubble water manufacturing device formed with the ultrafine bubble manufacturing unit according to claim 1, the ultrafine bubble water manufacturing device comprising:

a first pump pressure feeding raw material water;

a mixer mixing a gas into the raw material water pressure fed from the first pump to form the mixed fluid;

a second pump provided on a downstream side of the mixer;

a branch portion branching the mixed fluid into two paths on a downstream side of the second pump;

a return path connected to the branch portion and having a flow rate adjusting valve and a first ultrafine bubble manufacturing unit of the ultrafine bubble manufacturing units interposed therein, the return path returning water containing ultrafine bubbles of the gas manufactured in the first ultrafine bubble manufacturing unit between the mixer and the second pump; and an emission path connected to the branch portion and having a second ultrafine bubble manufacturing unit of the ultrafine bubble manufacturing units interposed therein, the emission path emitting water containing ultrafine bubbles of the gas manufactured in the second ultrafine bubble manufacturing unit.

6. An ultrafine bubble water manufacturing device formed with the ultrafine bubble manufacturing unit according to claim 1, the ultrafine bubble water manufacturing device comprising:

a first pump pressure feeding the mixed fluid obtained by mixing a gas into raw material water;

a mixer connected between a discharge side and a suction side of the first pump, mixing the gas into the mixed fluid discharged from the first pump and returning the mixed fluid to the suction side of the first pump;

the ultrafine bubble manufacturing unit provided on a downstream side of the first pump;

a second pump connected to a downstream side of the ultrafine bubble manufacturing unit;

a gas-liquid separator connected to a downstream side of the second pump; and an emission path emitting a liquid separated in the gas-liquid separator.

7. The ultrafine bubble water manufacturing device according to claim 5, wherein the second pump is a cascade pump.

8. The ultrafine bubble water manufacturing device according to claim 5, further comprising:

a gas amount adjusting valve adjusting an amount of the gas mixed with the mixer into the raw material water or the mixed fluid.

9. The ultrafine bubble water manufacturing device according to claim 8, further comprising:

a concentration meter measuring a concentration of the ultrafine bubbles in the water emitted from the emission path; and a control device controlling the gas amount adjusting valve, the second pump and the flow rate adjusting valve based on a measurement value of the concentration meter.

10. The ultrafine bubble water manufacturing device according to claim 8, further comprising:

an input portion having a diameter, a concentration and a flow rate of bubbles in bubble water needed to be emitted from the emission path input thereto;

a control device connected to the input portion and connected to the first pump, the second pump, the flow rate adjusting valve and the gas amount adjusting valve; and a table stored in the control device, the table storing possible values of a load of the first pump, a load of the second pump, a degree of opening of the flow rate adjusting valve and a degree of opening of the gas amount adjusting value and storing a diameter, a concentration and a flow rate of bubbles in bubble water emitted from the emission path corresponding to the possible values, wherein the control device extracts, based on values input to the input portion, with reference to the table, target values of the load of the first pump, the load of the second pump, the degree of opening of the flow rate adjusting valve and the degree of opening of the gas amount adjusting value, and controls the first pump, the second pump, the flow rate adjusting valve and the gas amount adjusting value so as to achieve the target values.

11. The ultrafine bubble water manufacturing device according to claim 6, wherein the second pump is a cascade pump.

* * * * *